US009861934B2

(12) United States Patent
Valentine et al.

(10) Patent No.: US 9,861,934 B2
(45) Date of Patent: Jan. 9, 2018

(54) CYCLONIC INJECTOR AND METHOD FOR REAGENT GASIFICATION AND DECOMPOSITION IN A HOT GAS STREAM

(71) Applicant: PEERLESS MFG. CO, Dallas, TX (US)

(72) Inventors: James M. Valentine, Fairfield, CT (US); Jeffrey Michael Broderick, Ridgefield, CT (US); Thomas V. Eldredge, Monroe, CT (US); Saiprasad Jangiti, Woodbury, CT (US); Eric Lindemann, Oxford, CT (US)

(73) Assignee: PEERLESS MFG.CO, Dallas, TX (US)

( * ) Notice: Subject to any disclaimer, the term of this patent is extended or adjusted under 35 U.S.C. 154(b) by 0 days.

(21) Appl. No.: 14/731,133

(22) Filed: Jun. 4, 2015

(65) Prior Publication Data

US 2015/0352491 A1  Dec. 10, 2015

Related U.S. Application Data

(60) Provisional application No. 62/007,573, filed on Jun. 4, 2014.

(51) Int. Cl.
*B01J 19/24* (2006.01)
*B01J 4/02* (2006.01)
(Continued)

(52) U.S. Cl.
CPC ......... *B01D 53/8631* (2013.01); *B01D 53/90* (2013.01); *B01J 4/002* (2013.01);
(Continued)

(58) Field of Classification Search
CPC ............... B01D 53/8631; B01D 53/90; B01D 2251/2067; B01D 2251/2062;
(Continued)

(56) References Cited

U.S. PATENT DOCUMENTS 4,246,757 A    1/1981  Heberling
4,756,890 A *  7/1988  Tang ..................... B01D 53/56
                                                    422/168
(Continued)

FOREIGN PATENT DOCUMENTS

EP          0266417 A1 *  5/1988  ............. B01D 53/56
WO     WO 8706853 A1 * 11/1987  ............. B01D 53/56

OTHER PUBLICATIONS

U.S. Appl. No. 13/313,683 Title: Injector and Method for Reducing Nox Emissions from Boilers, IC Engines and Combustion Processes Inventors: Scott H. Lindemann, Bruce E. Hartel, John N. Dale, Jeffrey M. Broderick, and James M. Valentine filed Dec. 7, 2011.

(Continued)

*Primary Examiner* — Timothy Vanoy
(74) *Attorney, Agent, or Firm* — Sean S. Wooden; Andrews Kurth Kenyon LLP

(57) ABSTRACT

A system for vaporizing and optionally decomposing a reagent, such as aqueous ammonia or urea, which is useful for NOx reduction, includes a cyclonic decomposition duct, wherein the duct at its inlet end is connected to an air inlet port and a reagent injection lance. The air inlet port is in a tangential orientation to the central axis of the duct. The system further includes a metering valve for controlling the reagent injection rate. A method for vaporizing and optionally decomposing a reagent includes providing a cyclonic decomposition duct which is connected to an air inlet port and an injection lance, introducing hot gas through the air inlet port in a tangential orientation to the central axis of the duct, injecting the reagent axially through the injection lance into the duct; and adjusting the reagent injection rate through a metering valve.

35 Claims, 1 Drawing Sheet

(51) Int. Cl.
  *B01D 53/94* (2006.01)
  *B01D 53/90* (2006.01)
  *B04C 3/00* (2006.01)
  *B01D 53/86* (2006.01)
  *B01J 4/00* (2006.01)

(52) U.S. Cl.
  CPC ............ *B01J 4/008* (2013.01); *B01J 19/2405* (2013.01); *B01D 53/8625* (2013.01); *B01D 53/9409* (2013.01); *B01D 2251/2062* (2013.01); *B01D 2251/2067* (2013.01); *B01D 2257/40* (2013.01); *B01D 2259/124* (2013.01); *B01J 2219/00063* (2013.01); *B01J 2219/00164* (2013.01); *B01J 2219/00186* (2013.01); *B01J 2219/00202* (2013.01); *B01J 2219/00231* (2013.01)

(58) Field of Classification Search
  CPC ............ B01D 2257/40; B01D 53/8625; B01D 53/9409; B01J 2219/00164; B01J 4/002; B01J 4/008; B01J 2219/00231; B01J 19/2405; B04C 3/00
  See application file for complete search history.

(56) References Cited

U.S. PATENT DOCUMENTS

| | | | |
|---|---|---|---|
| 5,809,910 | A | 9/1998 | Svendssen |
| 7,090,810 | B2 * | 8/2006 | Sun ............... B01D 53/8631 423/235 |
| 7,467,749 | B2 | 12/2008 | Tarabulski et al. |
| 7,815,881 | B2 | 10/2010 | Lin et al. |
| 8,449,288 | B2 | 5/2013 | Higgins |
| 8,501,131 | B2 | 8/2013 | Moyeda et al. |
| 8,591,849 | B2 | 11/2013 | Valentine et al. |
| 8,815,197 | B2 | 8/2014 | Broderick et al. |
| 2012/0177553 | A1 | 7/2012 | Lindemann et al. |
| 2013/0152470 | A1 | 6/2013 | Lindemann et al. |
| 2014/0099247 | A1 | 4/2014 | Jangiti et al. |

OTHER PUBLICATIONS

Birkwold, F., et al, "Analysis of the Injection of Ureawater-water-solution for Automotive SCR DeNOx-Systems" Institute for Chemical Technology and Polymer Chemistry, University of Karlsruhe, Germany, SAE International, 2006. p. 1-11.

* cited by examiner

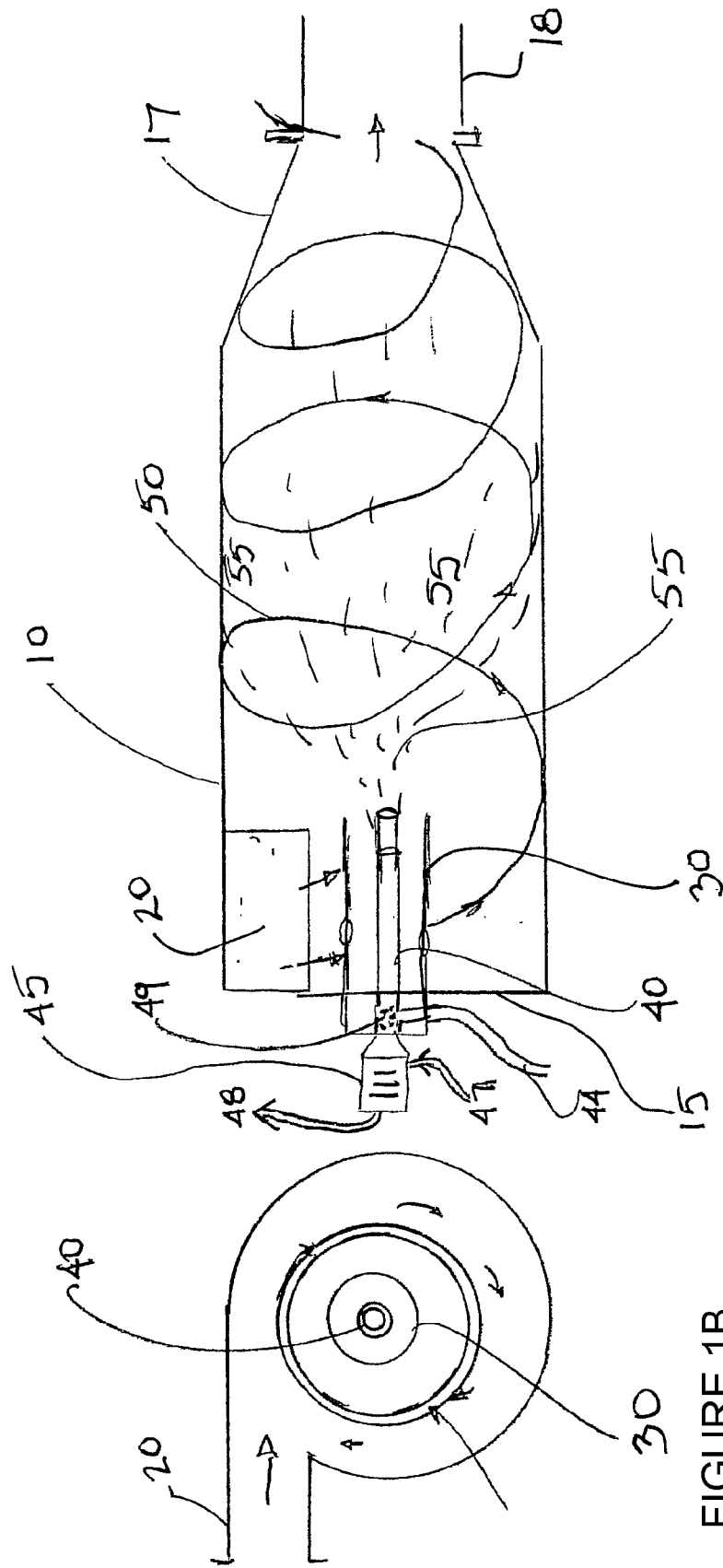

CYCLONIC INJECTOR AND METHOD FOR REAGENT GASIFICATION AND DECOMPOSITION IN A HOT GAS STREAM

FIELD OF THE INVENTION

The present invention relates generally to the reduction of oxides of nitrogen (NOx) emissions produced by lean burn combustion sources. In particular, the present invention provides a system and method for improved reagent gasification and decomposition in a hot gas stream by using a cyclonic decomposition apparatus.

BACKGROUND OF THE INVENTION

Injection of aqueous reagents including ammonia and urea is widely applied in the practice of Selective Non-Catalytic Reduction (SNCR) and Selective Catalytic Reduction (SCR) processes for the reduction of nitrogen oxide emissions from lean burn combustion sources. SCR has been applied to both mobile and stationary diesel engines as well as gas turbines and boilers. Products such as the XNOx™ SCR system marketed by Tenneco are now widely applied to commercial and off road vehicles. SNCR has more traditionally been applied to larger boilers for in furnace injection of reagent into a furnace cavity at an optimum temperature window of 1700-2200 F.

In certain SCR applications, the aqueous reagent is injected directly into the hot exhaust gases where the enthalpy of the exhaust gas will vaporize and decompose the reagent to ammonia gas upstream of the catalyst. U.S. Patent Application Publication Nos. 20130152470 to Lindemann, et al. and 20140099247 to Jangiti et al. describe several practical approaches to direct injection of aqueous reagents for SCR. In these applications, the duct dimensions, temperature, residence time, and quantity/type of reagent injected can impact the effectiveness of injection and distribution of reagent across the catalyst face. In larger SCR applications, an ammonia injection grid (AIG) is typically used to provide multiple points of injection of a gaseous reagent across a duct at a location upstream of an SCR catalyst. In SNCR applications, multiple levels of multiple injectors are typically used to distribute reagent across the furnace for decomposition and chemical reaction with NOx at high gas temperatures.

In some SCR applications, an aqueous based reagent is first decomposed to a gas before being injected into the exhaust duct. The reagent decomposition is accomplished by using a heated vaporizer reactor or a decomposition duct into which the reagent is injected along with a high volume of heated air and/or hot exhaust gases. In traditional urea decomposition systems, a side stream of exhaust gas or air is generally heated to a high temperature of 700-800 F and a gas flow rate of 600-1000 actual cubic feet per minute (ACFM) per gallon of reagent are used to vaporize and decompose the urea reagent.

Convention has held that wall wetting of the small exhaust duct on vehicles from urea based reagents should be avoided to prevent cool spots and the formation of urea deposits in the duct or downstream surfaces. Orientation of injectors, efforts to produce small droplet size of urea based reagents, and exhaust duct mixers have been used to minimize the wall wetting.

In SAE Paper 2006-01-0643, *"Analysis of the Injection of Urea-water-solution for Automotive SCR DeNOx-Systems,"* the authors, Birkhold et al., model the flow and spray/wall interaction of urea reagent injection into an exhaust duct and identify the risks of droplet impingement, localized cooling, and risk of formation of melamine complexes. Birkhold et al. recognize that wall wetting is difficult to prevent and merely develop equations to suggest the impact and design of wall interactions with reagents. They conclude that spray impingement on hot surfaces may lead to better evaporation and conversion to ammonia, but they fail to teach an improved means to avoid localized wall wetting and the formation of urea deposits.

While nitrogen oxide reduction systems are known in the art, there is no system that efficiently overcomes the urea deposit problem in urea based NOx reduction processes. Up to date, there is no effective gasification and decomposition apparatus that is suitable for use in both SNCR and SCR NOx reduction processes.

U.S. Pat. No. 7,815,881 to Lin et al. describes the use of a flue gas bypass duct for injection of urea and for conversion to ammonia for SCR. U.S. Pat. No. 7,090,810 to Sun et al. describes the reduction of NOx from large-scale combustors by injecting urea into a side stream of gases with temperature sufficient for gasification. But both of the patents are directed to large scale decomposition systems to convert urea solutions into gaseous ammonia, which require large decomposition reactors and residence times of greater than 1 second.

Commonly owned U.S. Pat. No. 8,815,197 to Broderick et al. and U.S. Pat. No. 8,591,849 to Valentine et al. describe small scale urea decomposition systems where the reagent injection rate is typically less than 10 gallons per hour (gph) with a gas flow rate in the duct at 150-3000 SCFM at a temperature greater than 700 F. The aqueous reagent is converted to ammonia gas in the decomposition duct and conveyed through the continuous duct to an ammonia injection grid placed in the primary exhaust upstream of a NOx reducing catalyst. While these patents demonstrate improvement and simplicity over the prior art, it would still be desirable to reduce the gas flow rate, to cut down on the fan/blower size and operating horsepower, as well as to minimize the supplemental heat required to raise the exhaust gas temperature to the decomposition duct.

U.S. Pat. No. 5,809,910 to Svebdssen teaches a means for NOx reduction in a large incinerator wherein rotation and turbulence in the flame of the unit are used for thermal SNCR NOx reduction at a temperature of 900-1000° C. Combustion air, recirculated flue gases, fuel, and reducing reagent are introduced into the incinerator unit with over fire air (OFA) or rotating over fire air (ROFA) through asymmetrically positioned ducts. All agents and gases in the incinerator are thereby rotated in the combustion zone.

Similarly, U.S. Pat. No. 8,449,288 to Higgins teaches the use of asymmetrical secondary air ducts to produce high velocity mass flow, turbulence and rotation with urea injection for in-furnace SNCR NOx reduction at 2000 F.

Both Svebdssesn and Higgins are not aimed at converting urea to ammonia for use in a catalytic reduction process but are directed at improving the high temperature non-catalytic SNCR NOx reduction reactions. Neither of them is preferred because of the high temperature requirement.

U.S. Pat. No. 8,501,131 to Moyeda teaches a combined SNCR and SCR NOx system that involves reagent injection in the high temperature SNCR zone and supplementary injection of reagent in the duct before the SCR catalyst. A high pressure steam is mixed with reagent to transport it through nozzles arranged on the duct wall to penetrate the gas stream and mix the reagent with the flue gases before the catalyst. There is also a reference to the use of air as a transport fluid and the suggestion that the reagent may be in a gas form if injected with air as the transport medium. However, Moyeda does not teach the vaporization and decomposition of urea to ammonia before injection of the reagent.

U.S. Pat. No. 4,246,757 to Heberling describes vaporizing fuel using a cyclonic prechamber, which is part of a combustion apparatus, for a gas turbine. The prechamber includes a plurality of highly angled vanes disposed circumferentially around the cylindrical prechamber to provide a high tangential component of velocity to combustion air in the prechamber. Liquid fuel is introduced into the prechamber and premixed with the combustion air in the cyclonic zone and continuously discharged through a throat to a combustion zone. However, Heberling neither concerns decomposition of reagent, nor addresses the issue of undesired urea deposits.

In general, the art either discloses that a high gas temperature is required for urea based NOx reduction systems or large quantities of hot gas are required to decompose urea reagent while at the same time preventing the formation of reagent deposits. The cost for heaters and fans utilizing high volumes of heated air and/or hot exhaust gases can be prohibitive for small boilers and very expensive for larger applications. It would be desirable to have a simple and cost effective method of vaporizing and/or decomposing common reagent such as aqueous ammonia or urea with a minimum of hot gas flow and without the formation of reagent deposits.

SUMMARY OF THE INVENTION

It is an objective of the present invention to provide a system and method for decomposing aqueous urea reagent to a gaseous form or gasifying aqueous ammonia reagent using a reduced quantity of hot gas while preventing the aqueous reagent from forming deposits in a decomposition duct or ammonia injection grid (AIG).

It is also an objective of the present invention to provide a system and method for adjusting reagent injection rate without changing the residence time, velocity, and temperature of gas flowing through a decomposition duct.

It is further an objective of the present invention to provide a system and method for increasing the velocity of a mixture of vaporized reagent and hot gas at the outlet of a combustion duct.

These and other objectives are achieved by providing a system and method which uses an inventive cyclonic decomposition duct for injecting, mixing, and decomposing an aqueous reagent (e.g., urea and ammonia) with hot air for NOx reduction. A system of the present invention comprises a cyclonic decomposition duct with a longitudinal central axis having an inlet end and an outlet end, wherein the cyclonic decomposition duct at its inlet end is connected to an air inlet port for supply of a carrier gas and the inlet port is in a tangential orientation to the central axis of the cyclonic decomposition duct, wherein the cyclonic decomposition duct at its inlet end is further connected to an injection lance for supply of a flow of reagent axially into the cyclonic decomposition duct, and a metering valve for controlling the injection rate of the reagent into the cyclonic decomposition duct.

In accordance with the present invention, a low volume of heated gas enters a cylindrical shaped cyclonic mixing duct in a tangential fashion that imparts a cyclonic rotation to the hot gas around the injection shroud inside the duct and down the length of the mixing duct. A reagent (e.g., aqueous ammonia, aqueous urea) is introduced into the larger diameter mixing duct through an injection lance, which is inserted into the shroud. Preferably, the outlet tip of the lance protrudes slightly beyond the length of the shroud and the shroud extends past the length of the air inlet port such that reagent droplets are sprayed into the cyclonic hot gas flow through the outlet tip of the lance. Even more preferably, the injection lance is surrounded by a cooling shield. The cyclonic flow of hot gas serves to effectively heat the mixing duct, including the walls (i.e., inner surfaces) of the mixing duct, in the area of the reagent injection and assists in evaporating and decomposing the reagent to ammonia gas. It also serves to "scrub" the walls of the mixing duct to remove any liquid reagent or byproducts of reagent decomposition. The scrubbing action, in conjunction with maintaining the chamber walls of the duct above a critical temperature, tend to minimize deposit formation on the walls.

In some advantageous embodiments, a mixer may be located downstream of the reagent injection point to mix the decomposed gaseous reagent and carrier gas towards the outlet of the mixing duct; and/or, a cone shaped duct piece may be used to force the hot gas and reagent to converge towards the end of the mixing duct and the decomposed gaseous reagent may be exhausted into a larger or smaller diameter portion of duct and further mixed for routing to an AIG.

In certain embodiments, the hot carrier gas supplied to the cyclonic decomposition duct is a hot gas slip stream, a full flow of a primary hot exhaust gas, or a heated ambient air, or a combination thereof.

In certain advantageous embodiments, when the reagent is aqueous ammonia, a flow rate of the carrier gas between 50-150 SCFM per gallon of reagent and a wall temperature of the duct above 600 F are used to decompose urea; when the reagent is aqueous ammonia, a flow rate of the carrier gas between 25-100 SCFM per gallon of reagent and a lower temperature than 600 F are used to vaporize ammonia.

In some embodiments, the metering valve which controls the reagent injection rate is a return flow injector with the reagent flowing from a reagent storage vessel to, through and back from the metering valve, to a reagent storage vessel.

In certain embodiments, a mechanical atomizer is affixed to the cyclonic decomposition duct for supplying atomized reagent.

In further embodiments, the system comprises a sensor positioned in a primary exhaust duct after a catalyst chamber, and wherein the quantity and injection rate of the reagent injected into the decomposition duct is based at least in part on a measurement of NOx concentration and/or ammonia slip received from the sensor.

In certain embodiments, the reagent injection rate of the reagent to the cyclonic decomposition duct is less than 1 gallon per hour.

In additional embodiments, the outlet of the duct is connected directly to a primary exhaust duct or other distribution device such as AIG for distributing decomposed reagent across a catalyst for NOx reduction. A method of the present invention comprises the steps of: providing a cyclonic decomposition duct with a longitudinal central axis having an inlet end and an outlet end at each end of the axis, wherein the cyclonic decomposition duct at its inlet end is connected to an air inlet port and an injection lance, introducing a flowing stream of hot carrier gas through the air inlet port in a tangential orientation to the central axis of the cyclonic decomposition duct, injecting the reagent axially through the injection lance into the duct; providing a metering valve to control the injecting rate of the reagent into the cyclonic decomposition duct; and adjusting the injection rate of the reagent; wherein the inlet end, the longitudinal central axis, and the outlet end together define an axial flow path for the carrier gas and reagent passing through the cyclonic decomposition duct.

In some embodiments, the method further comprises the step of controlling the flow rate of the carrier gas into the decomposition duct via a flow control valve connected the air inlet port. In certain of these embodiments, the gas flow rate is 25-500 SCFM per gallon of reagent.

In further embodiments, the method comprises the step of controlling the temperature of the carrier gas to be above 700 F at the air inlet port to the duct.

In certain embodiments, the method comprises the step of controlling the injection rate of the reagent into the decomposition duct.

In further embodiments, the method comprises the step of measuring NOx concentration and/or ammonia slip via a sensor positioned in a primary exhaust duct downstream, wherein the quantity and injection rate of the reagent injected into the decomposition duct is based at least in part on the measurements received from the sensor.

Other objects of the invention and its particular features and advantages will become more apparent from consideration of the following drawings and accompanying detailed description.

BRIEF DESCRIPTION OF THE DRAWINGS

FIG. 1A is a side cross-sectional view of a cyclonic decomposition duct in accordance with one embodiment of the present invention.

FIG. 1B is a front cross-section view of the cyclonic decomposition duct of the FIG. 1A embodiment, looking from the outlet end of the duct.

DETAILED DESCRIPTION OF THE INVENTION

The present invention provides a simple and cost effective system and method for vaporizing and/or decomposing aqueous reagent in a hot gas stream to generate vaporized reagent or decomposed reagent for use in SNCR and SCR NOx reduction processes, while at the same time minimizing the formation of reagent deposits during the processes. Specifically, the present invention utilizes a cyclonic apparatus as a chamber for the injection, mixing, decomposition, and vaporization of the reagent- and hot gas.

FIGS. 1A and 1B illustrate one exemplary embodiment of a cyclonic decomposition duct in accordance with the present invention. FIG. 1A shows a cross-sectional view of the cyclonic decomposition duct and FIG. 1B shows a view of the cyclonic decomposition duct looking from the outlet end of the duct.

As shown in FIG. 1A, the cyclonic decomposition duct (10) has an inlet end (15) and an outlet end (17). A hot gas inlet port (20) for supply of hot gas is positioned at the inlet end (15) of the duct (10) in a tangential orientation to the longitudinal central axis of the duct (10) for introducing hot carrier gas (50). The inlet end (15), the outlet end (17), and the longitudinal central axis, together, define an axial flow path for the hot gas (50) and reagent passing through the cyclonic decomposition duct. The hot gas tangential inlet (20) may be rectangular as shown in FIG. 1A or round, oval, or square. An injection shroud (30) is positioned at the inlet end (15) of the duct (10) and centered in the axis of the duct at the inlet end (15) and normally extends a short distance past the length of the hot gas inlet port (20).

An injection lance (40) for supply of reagent is positioned in the inlet end of the duct (15) and generally extends a short distance beyond the shroud (30). An atomizing air (44) is supplied to the lance and a metering valve (45) is connected to the lance to control the injection rate of the reagent into the cyclonic decomposition duct (10). Part of the injection shroud (30) and injection lance (40) are inside the duct, as shown in FIG. 1A.

Typically the cyclonic decomposition duct (10) is made of a stainless material and is insulated to retain the heat transferred to the duct chamber from the hot gas (50) throughout the duct (10).

The cyclonic decomposition duct may be a cylindrical duct having a constant diameter throughout its central axis. In some preferred embodiments as shown in FIG. 1A, most part of the duct is of a cylindrical shape, but the outlet end (17) of the duct (10) is a converging cone that helps to complete mixing and increases the velocity at the outlet of the duct. The diameter of the duct typically ranges from 2 to 36 inches, preferably from 4 to 24 inches, with the larger of the diameter range being the diameter of the cylindrical section and the smaller of the diameter range being the smallest diameter of the cone section.

The outlet of the duct (10) may be connected by a flange to a further length of duct (18) to transport the vaporized and/or decomposed reagent to an AIG header or lance, or the outlet may be connected directly to the header or AIG lance. It will be recognized that the outlet of the duct can also be connected directly to a primary exhaust duct or other distribution device. The introduction of the gaseous reagent into the primary exhaust serves to reduce NOx emissions across a catalyst located downstream of the reagent introduction point.

In the present invention, an aqueous reagent (e.g., ammonia, urea) is injected as droplets (55) into the mixing duct (10) via the small diameter injection lance (40). In some advantageous embodiments, the injection shroud (30) extends a distance along the axis of the duct past the length of the hot gas inlet port (20) and an outlet tip of the injection lance (40) further protrudes slightly beyond the length of the injection shroud (30), as shown in FIG. 1A. This design enables the reagent droplets (55) to be sprayed directly into a cyclonic hot gas flow inside the duct through the outlet tip of the lance. By exposing the outlet tip of the injection lance (40) beyond the length of the shroud to the cyclonic flow of hot gas, it also prevents the formation of reagent deposit on the injection lance (40).

As shown in FIG. 1B, hot gas enters the mixing duct (10) via the air inlet port (20) in a tangential fashion and produces a cyclonic rotation of hot gas (50) through the length of the duct (10). This cyclonic flow helps to throw large droplets of reagent (55) to the walls (i.e., inner surfaces) of the decomposition duct (10) that have been heated by the flow of hot gas (50). Reagent droplets (55) are thus distributed, evaporated, and decomposed to ammonia gas in the cyclonic duct (10). The cyclonic flow helps continuously mix the hot gas (50) with the reagent droplets (55) and also provides a scouring action to sweep decomposed reagent off the walls of the duct (10) and prevent the formation of deposits on the inside wall. The flow of the hot gas (50) then carries the vaporized reagent out of the chamber via the outlet port (18) for use in NOx reduction, as shown in FIG. 1A.

In addition to preventing reagent deposit from forming on the chamber wall, the present invention provides a system and method for preventing reagent deposit from forming in the injector and shroud area. As shown in FIG. 1A, the injection lance (40) may have a mixing chamber (49) with a plurality of holes (not shown) to allow atomizing air to mix with and atomize the reagent. Other type of atomizer known to a person skilled in the art may be connected to the decomposition duct for supplying atomized reagent to the duct.

The atomizing air and liquid reagent flow through the injector are useful to keep urea deposits from forming in the injector and the injection lance (40). To avoid reagent deposition in the shroud (30), slots (not shown) in the shroud (30) may be used to allow hot gas to sweep in and around the reagent injector to help keep reagent from building up or depositing in the shroud. Alternatively, a slip stream of purge air may be introduced in the shroud (30) to help minimize reagent build up and deposit formation in the shroud.

The same structure provides flexibility to prevent hydrolysis of reagent inside the injection lance. For high temperature applications, cooling the injection lance is preferred to avoid hydrolysis of the reagent therein. In that case, the injection lance may be surrounded by a cooling shield. Optionally, a feed of cooling air may be supplied to provide air flow between the barrel of the lance and the cooling shield.

In the present invention, a hot gas slip stream, or a full flow of a primary hot exhaust gas, or a heated ambient air, or combinations of these may be used to provide the hot gas flow to and through the cyclonic decomposition duct. The hot gas may be generated by using an electric heater, a burner, heat exchanger, steam, or recirculated exhaust gas, and any of these methods may be used alone or in combination. A fan or blower may be used to help circulate the hot gas to and through the cyclonic injection duct and over to the AIG.

One advantage of the present invention is that a lower gas flow rate and a lower temperature, as compared to the prior art, may be required in the current invention to decompose urea based reagent thereby resulting in savings in fan power and/or fuel required to heat the hot gas flow. In the prior art, a gas flow rate of 600-1000 ACFM per gallon of regent at a temperature of above 700 F is typically required for urea decomposition.

In accordance with the present invention, a carrier gas flow rate in the range of 25-500 SCFM per gallon of reagent and a gas temperature of above 700 F at the air inlet port to the duct is suitable to be used in the present invention. In some preferred embodiments, a flow rate of 100-300 actual cubic feet per minute (ACFM) per gallon of urea reagent may be used. In some embodiments, the gas flow rate of 50-150 SCFM per gallon of reagent is used to decompose aqueous urea, and in some other embodiments, the gas flow rate is 25-100 SCFM/gallon is used for vaporizing aqueous ammonia reagent. To control the flow rate of the carrier gas flowing to the cyclonic decomposition duct, a flow control valve may be used to connect to both the supply of the carrier gas and the air inlet port. The flow control valve may be positioned upstream of the decomposition duct.

In general practice, it will be desirable, when decomposing urea based reagent, to balance the hot gas flow rate, the reagent injection rate, and the mixing duct dimensions so as to maintain an inside wall temperature of the duct above 600 F, preferably above 650 F, and the gas temperature at the outlet port of the mixing duct is above 500 F, preferably above 600 F. Lower wall temperatures and exit gas temperatures may be acceptable when gasifying aqueous ammonia reagent in the current invention. A sensor is placed on the inside wall of the duct to measure the wall temperature. Preferably, the temperature measurement is conducted at a point before reagent injection.

Accordingly, in some embodiments, when the reagent is urea, the method includes the step of setting the carrier gas flow rate and gas temperature in the decomposition duct before a point of reagent injection such that a temperature of the inside wall temperature of the duct is maintained at above 600 F and an exit gas temperature is above 500 F. In additional embodiments, when the reagent is aqueous ammonia, the method includes the step of setting the hot carrier gas flow rate and gas temperature in the decomposition duct before a point of reagent injection such that a temperature of the inside wall temperature of the duct is maintained at a desired, lower temperature, preferably at about 250 F or above.

It is generally preferred that the residence time from the point of reagent injection into the cyclonic decomposition duct to the introduction of decomposed reagent into the primary exhaust or AIG be less than 1 second. The residence time depends on the diameter and length of a decomposition duct, the volume of hot carrier gas, and the quantity of urea injected. Thus, the step of adjusting the flow rate of the carrier gas must take the residence time into consideration.

A metering valve in communication with the injection lance is used for controlling the reagent injection rate into the cyclonic decomposition duct. The metering valve can be affixed directly to the inlet end of the decomposition duct but is preferably attached to an air assisted injection lance such that the valve is remote from the heat of the duct which helps to prevent hydrolysis and deposits of reagent from forming in the injector metering valve and lance.

The metering valve (45) may be of a return flow type, as described in U.S. Pat. No. 7,467,749 to Tarabulski et al., the specification of which is incorporated herein in its entirety. When it is a return flow type valve, the metering valve (45) is connected to a reagent inlet supply connection (47) for supplying the reagent and a reagent return line (48) for returning the reagent to storage. Alternatively a non return flow metering valve or other injector known to those skilled in the art may be connected to the lance to atomize and feed the reagent to the lance. A preferred form of injection lance is as described in US patent application 2012/0177553 to Lindemann et al.

In some cases, a metering valve with a mechanical atomizing tip (not shown) or swirl plate (not shown) may be affixed directly to the inlet end of the decomposition duct without the injection lance, and in which case, it is generally preferred to use the return flow metering valve as described before. However, the injection lance is preferred over the metering valve with a mechanical atomizing tip or swirl plate because the injection lance normally provides better atomization of the reagent and prevents hydrolysis of the reagent in the metering valve by further cooling the reagent and removing it from the heat of the duct.

The system may include a sensor positioned in a primary exhaust duct after a catalyst chamber, and the quantity and injection rate of the reagent injected into the plurality of decomposition ducts is based at least in part on a measurement of NOx concentration and/or ammonia slip received from the sensor. One goal is to provide necessary quantity of reagent at a suitable injection rate to the decomposition duct so as to achieve the desired emissions after the NOx treatment and to control the residence time from the point of reagent injection into the cyclonic decomposition duct to the introduction of decomposed reagent into the primary exhaust or AIG to be less than 1 second.

A programmable logic controller (PLC) or electronic control unit (ECU) controller or any other suitable controller may be employed together with the sensor to adjust the reagent injection rate. The adjustment is based on many factor, such as combustor load, fuel flow rate, exhaust gas flow rate, decomposition gas flow rate and/or temperature, NOx concentration before or after the catalyst, ammonia slip past the SCR catalyst or any combination of those sensor measurements. An injection control system such as the TRIM-NOX® injection system marketed by CCA Combustion Systems of Monroe, Conn., is ideally suited to the practice of the present invention.

In some embodiments, the reagent injection rate of the reagent is less than 10 gallons per hour (gph). In some preferred embodiment, the reagent injection rate is less than 1 gph.

For following are non-limited examples of the present invention:

Example 1

A slip stream of hot gas from a 175 KW diesel engine exhaust is used to provide a hot gas stream to the cyclonic decomposition apparatus. Approximately 200 ACFM of exhaust gas at a temperature of 740 F is ducted to the cyclonic spool piece and introduced in a tangential flow pattern to the inlet end of the device. An injection lance of the type described in the pending U.S. patent application Ser. No. 13/313,683 is inserted axially into the inlet end of the decomposition duct. 32% urea aqueous solution is introduced through the lance and into the rotating hot gas flow inside the duct. The outlet end of the duct converges into a small diameter cone that is exhausted to atmosphere for visual observation. When operated at a reagent injection rate of 0.9 gph of 32% urea solution over a thirty minute observation period, there is no visual evidence of liquid or solid particles of urea being emitted from the outlet of the apparatus, only a gaseous cloud of vaporized reagent.

The outlet of the apparatus can then be fed directly to a port on an exhaust duct upstream of a catalyst or it can be fed to the distribution headers of a traditional AIG, or to funnel mounted to a duct wall with multiple outlet ports. Alternatively a cyclonic spool piece can be positioned at each individual header feeding a group of lances of an AIG positioned in the primary exhaust gas flow upstream of a catalyst. In some cases the cyclonic injector may feed into an AIG positioned in a side stream of the main exhaust which is then passed through a catalyst and recombined with the bulk of the primary exhaust. In other cases the cyclonic injector may feed a side stream of exhaust gas which is then reintroduced into the primary exhaust gas flow before a catalyst.

Example 2

The outlet end of the cyclonic decomposition duct from Example 1 is connected to an AIG lance with multiple outlet ports positioned along its length. The AIG lance is inserted into the primary exhaust of a 175 KW diesel engine and positioned upstream of a catalyst. A slip stream of engine exhaust flowing at 200 ACFM and 740 F is drawn off from the primary exhaust upstream of the AIG lance location and ducted to the tangential inlet of the cyclonic decomposition duct. Urea reagent is injected axially into the inlet end of the duct through a low pressure injection lance at a rate of 0.9 gph. An atomizing air at a rate of 7 SCFM and 10 psi is used to assist atomization in the injection lance.

The NOx emission rate in the primary exhaust from the engine is 1277 ppm when measured upstream of the AIG lance using a hand held NOx meter. With the cyclonic decomposition duct operating and an injection rate of 0.9 gph, the NOx measured downstream of the catalyst is 45 ppm, representing more than a 96% reduction in NOx emissions, which indicates that the apparatus is successfully decomposing urea solution to ammonia gas. After 4 hours of operation, the engine is shut down and the decomposition system, AIG lance and catalyst face are inspected. There are no signs of urea deposits observed on any of the components.

While the above description is generally directed at SCR applications, it will also be apparent that the benefits of the cyclonic decomposition duct in producing a vaporized and atomized reagent may be applied in certain cases to the introduction of a gaseous reagent into the high temperature zone of a furnace for traditional SNCR reactions with NOx. In that case, the hot gas flow rate to the duct may be increased to provide greater mass flow for introduction and penetration of the gaseous reagent into the furnace zone. Alternatively, steam may be used in the device as an alternative to hot gas for the decomposition and transport of gaseous reagent.

Although the invention has been described in connection with various illustrated embodiments, numerous modifications and adaptations may be made thereto without departing from the spirit and scope of the invention as set forth in the claims.

What is claimed is:

1. A system for vaporizing a reagent for NOx reduction in an exhaust of a lean burn combustion source comprising:
   a cyclonic decomposition duct with a longitudinal central axis having an inlet end and an outlet end;
   wherein the cyclonic decomposition duct at its inlet end is in communication with an air inlet port for supply of carrier gas, the inlet port is in a tangential orientation to the central axis of the cyclonic decomposition duct,
   wherein the cyclonic decomposition duct at its inlet end is further in communication with a mechanically atomized injector for supply of a flow of the reagent axially into the cyclonic decomposition duct;
   wherein the outlet end is conical and the carrier gas exits the cyclonic decomposition duct through the conical outlet end; and
   a metering valve in communication with the mechanically atomized injector for controlling injection rate of the reagent into the cyclonic decomposition duct.

2. The system of claim 1, wherein the mechanically atomized injector is enclosed in an injection shroud, wherein the injection shroud is centered in the axis of the duct at the inlet end, and wherein the injection shroud extends a distance inside the duct past the length of the air inlet port.

3. The system of claim 2, wherein an outlet tip of the mechanically atomized injector extends a distance inside the duct past the length of the injection shroud.

4. The system of claim 2, wherein the mechanically atomized injector is surrounded by a cooling shield.

5. The system of claim 1, wherein the cyclonic decomposition duct comprises a cylindrical duct section and a cone duct section, and wherein at the outlet end the decomposition duct is tapered to the cone having a smaller diameter than that of the cylindrical duct.

6. The system of claim 1, wherein the carrier gas is a hot gas slip stream, a full flow of a primary hot exhaust gas, or a heated ambient air, or a combination thereof.

7. The system of claim 1, wherein when the reagent is aqueous urea, the carrier gas is supplied into the duct at a flow rate 50-150 SCFM per gallon of reagent, and an inside wall of the duct being heated by the carrier gas has a temperature of above 600 F before a point of reagent injection.

8. The system of claim 1, wherein when the reagent is aqueous ammonia, the carrier gas is supplied into the duct at a flow rate 25-100 SCFM per gallon of the reagent, and an inside wall of the duct heated by the carrier gas has a temperature of above 250 F before a point of reagent injection.

9. The system of claim 1, wherein the metering valve is a return flow injector with the reagent flowing from a reagent storage vessel to, through and back from the metering valve, to a reagent storage vessel.

10. The system of claim 1, further comprising an atomizer affixed to the cyclonic decomposition duct for supply of an atomized reagent.

11. The system of claim 1, wherein the injection rate of the reagent to the cyclonic decomposition duct is less than 1 gallons per hour.

12. The system of claim 1, wherein the system further comprises a sensor positioned in a primary exhaust duct downstream, and wherein a quantity and injection rate of the reagent injected into the decomposition duct is based at least in part on a measurement of nitrogen oxide concentration and/or ammonia slip received from the sensor.

13. The system of claim 1, wherein a gaseous mixture of the carrier gas and reagent is ducted from the outlet of the cyclonic decomposition duct to a wall of an exhaust duct and introduced into a primary exhaust of a lean burn combustor upstream of a catalyst or to an ammonia injection grid that is positioned in the exhaust of a lean burn combustor upstream of a catalyst.

14. The system of claim 1, wherein the outlet of the cyclonic decomposition duct is positioned on a furnace wall to introduce a gaseous mixture of the carrier gas and reagent into the furnace in a zone where the combustion gases are at a temperature of 1700-2200 F.

15. A system for vaporizing a reagent for NOx reduction in an exhaust of a lean burn combustion source comprising:
a cyclonic decomposition duct with a longitudinal central axis having an inlet end and an outlet end;
wherein the duct at its inlet end is in communication with an air inlet port for supply of carrier gas, the inlet port is in a tangential orientation to the central axis of the duct,
wherein the duct at its inlet end is further communication with an injection lance for supply of a flow of the reagent axially into the duct;
wherein the injection lance is enclosed in an injection shroud and centered in the axis of the duct at the inlet end, and wherein the injection shroud extends a distance inside the duct past the length of the air inlet port;
wherein an outlet tip of the injection lance extends a distance inside the duct past the length of the injection shroud; and wherein a portion of the injection lance and a portion of the shroud are inside the duct,
wherein the outlet end is conical and the carrier gas exits the cyclonic decomposition duct through the conical outlet end.

16. The system of claim 15, further comprising a metering valve in communication with the injection lance for controlling injection rate of the reagent into the duct.

17. The system of claim 15, wherein the cyclonic decomposition duct comprises a cylindrical duct section and a cone duct section, and wherein at the outlet end the decomposition duct is tapered to the cone having a smaller diameter than that of the cylindrical duct.

18. A method for vaporizing a reagent for NOx reduction in an exhaust of a lean burn combustion source comprising the steps of:
providing a cyclonic decomposition duct with a longitudinal central axis having an inlet end and an outlet end at each end of the axis, the cyclonic decomposition duct at its inlet end in communication with an air inlet port and an injection lance,
introducing a flowing stream of carrier gas through the air inlet port in a tangential orientation to the longitudinal central axis of the cyclonic decomposition duct,
injecting the reagent axially through the injection lance into the duct, wherein the reagent is an aqueous urea or aqueous ammonia;
providing a metering valve in communication with the injection lance to control an injecting rate of the reagent into the cyclonic decomposition duct; and
adjusting the injection rate of the reagent by use of the metering valve;
wherein the inlet end, the longitudinal central axis, and the outlet end define an axial flow path for the carrier gas and the reagent passing through the cyclonic decomposition duct; and
wherein a gaseous mixture of the carrier gas and vaporized ammonia exits the duct through the outlet end of the duct, wherein the outlet end is conical.

19. The method of claim 18, wherein the injection lance is enclosed in an injection shroud, wherein the injection shroud is centered in the axis of the duct at the inlet end, wherein the injection shroud extends a distance inside the duct past the length of the air inlet port; and wherein an outlet tip of the injection lance extends a distance inside the duct past the length of the injection shroud.

20. The method of claim 18, wherein the cyclonic decomposition duct comprises a cylindrical duct section and a cone duct section, and wherein at the outlet end the decomposition duct is tapered to the cone having a smaller diameter than that of the cylindrical duct.

21. The method of claim 18, wherein the carrier gas is a hot gas slip stream, a full flow of the primary hot exhaust gas, or a heated ambient air, or a combination thereof.

22. The method of claim 18, further comprising the step of controlling the carrier gas flow rate to the decomposition duct via a flow control valve in communication with the air inlet port.

23. The method of claim 18, further comprising the step of setting the carrier gas flow rate to be 25-500 SCFM per gallon of reagent and the step of setting a temperature of the carrier gas to be above 700 F at the air inlet port to the duct.

24. The method of claim 22, wherein when the reagent is aqueous urea, wherein the method further comprises the step of setting the carrier gas flow rate to be 50-150 SCFM per gallon of the reagent and the step of setting a gas temperature of the carrier gas such that an inner wall of the duct heated by the carrier gas has a temperature of above 600 F.

25. The method of claim 22, wherein when the reagent is aqueous ammonia, wherein the method further comprises the step of setting the carrier gas flow rate to be 25-100 SCFM per gallon of reagent.

26. The method of claim 18, wherein the metering valve is a return flow injector with reagent flowing from a reagent storage vessel to, through and back from the metering valve to a reagent storage vessel.

27. The method of claim 18, wherein an atomizer is affixed to the cyclonic decomposition duct to supply an atomized reagent.

28. The method of claim 18, further comprising the step of measuring NOx concentration and/or ammonia slip via a sensor positioned in a primary exhaust duct downstream of a catalyst, wherein a quantity and injection rate of the reagent injected into the decomposition duct is based at least in part on the measurements received from the sensor.

29. The method of claim 18, wherein the injection rate of the reagent to the cyclonic decomposition duct is less than 1 gallons per hour.

30. The method of claim 18, wherein a residence from a point of reagent injection into the cyclonic decomposition duct to an introduction of a vaporized reagent into a primary exhaust or an ammonia injection grid is less than 1 second.

31. The method of claim 18, wherein the gaseous mixture of the carrier gas and vaporized ammonia is ducted from the outlet of the decomposition duct to the wall of an exhaust duct and introduced into the primary exhaust of a lean burn combustor upstream of a catalyst for the reduction of NOx.

32. The method of claim 18, wherein the gaseous mixture of the carrier gas and vaporized ammonia is ducted to an ammonia injection grid that is positioned in the exhaust of a lean burn combustor upstream of a catalyst.

33. The method of claim 18, wherein the outlet end of the decomposition duct is positioned on a furnace wall to introduce the vaporized ammonia into the furnace in a zone where the combustion gases are at a temperature of 1700-2200 F.

34. The method of claim 18, wherein the exhaust flow of a diesel or natural gas fired IC engine is introduced into the cyclonic decomposition duct and an aqueous reagent is introduced into the rotating exhaust gases in the duct to produce a gaseous mixture containing ammonia, and wherein the outlet of the duct containing exhaust gases and ammonia is passed through a catalyst for the reduction of NOx.

35. The method of claim 18, wherein a slip stream of exhaust gases from an IC engine is drawn off from a primary exhaust and passed through the cyclonic decomposition duct and the reagent is introduced into the decomposition duct and converted to ammonia gas which is then mixed with primary exhaust gases, and wherein the resulting combined mixture of reagent and exhaust gas is passed over a catalyst for the reduction of NOx.

* * * * *